US007792841B2

(12) United States Patent
McAllister et al.

(10) Patent No.: US 7,792,841 B2
(45) Date of Patent: Sep. 7, 2010

(54) EXTRACTION AND SUMMARIZATION OF SENTIMENT INFORMATION

(75) Inventors: Ian A. McAllister, Seattle, WA (US); Christoph R. Ponath, Woodinville, WA (US); Ling Bao, Redmond, WA (US); Steven J. Hanks, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 482 days.

(21) Appl. No.: 11/442,909

(22) Filed: May 30, 2006

(65) Prior Publication Data

US 2007/0282867 A1 Dec. 6, 2007

(51) Int. Cl.
*G06F 7/00* (2006.01)

(52) U.S. Cl. .................. 707/749; 707/755; 707/899; 705/10

(58) Field of Classification Search .................. None
See application file for complete search history.

(56) References Cited

U.S. PATENT DOCUMENTS

| | | | |
|---|---|---|---|
| 5,987,440 | A | 11/1999 | O'Neil et al. |
| 6,112,186 | A | 8/2000 | Bergh et al. |
| 6,748,449 | B1 | 6/2004 | Dutta |
| 7,006,999 | B1 | 2/2006 | Huberman et al. |
| 2001/0047290 | A1* | 11/2001 | Petras et al. ............ 705/10 |
| 2003/0182177 | A1 | 9/2003 | Gallagher et al. |
| 2003/0212673 | A1* | 11/2003 | Kadayam et al. ............ 707/3 |
| 2004/0267561 | A1 | 12/2004 | Meshkin et al. |
| 2005/0091038 | A1* | 4/2005 | Yi et al. ............ 704/10 |
| 2005/0187932 | A1* | 8/2005 | Kanayama et al. ............ 707/6 |
| 2005/0234877 | A1 | 10/2005 | Yu |
| 2005/0283377 | A1 | 12/2005 | Nagano et al. |
| 2006/0026123 | A1 | 2/2006 | Moore et al. |
| 2006/0042483 | A1 | 3/2006 | Work et al. |
| 2006/0218179 | A1* | 9/2006 | Gardner et al. ............ 707/102 |
| 2007/0179835 | A1* | 8/2007 | Ott et al. ............ 705/10 |

OTHER PUBLICATIONS

Author: Minqing Hu and Bing Liu; Title: "Mining and Summarizing Customer Reviews"; Date: Aug. 22-25, 2004; Pertinent Pages: whole document.*
Author: Bing Liu, Minqing Hu and Junsheng Cheng; Title: "Opinion Observer: Analyzing and Comparing Opinions on the Web"; Date: May 10-14, 2005; Pertinent Pages: whole document.*
Masum, Hassan "TOOL: The Open Opinion Layer", http://www.firstmonday.dk/Issues/issue7_7/masum/.
Liu, Bing et al., "Opinion observer: analyzing and comparing opinions on the Web", http://portal.acm.org/citation.cfm?id=1060797&coll=GUIDE&dl=GUIDE&CFID=71552434&CFTOKEN=5435.
Meersman, Robert et al.,"Amicalola Report: Database and Information Systems Research Challenges and Opportunities in Semantic Web and Enterprises", http://Isdis.cs.uga.edu/Sem.

\* cited by examiner

*Primary Examiner*—Tim T. Vo
*Assistant Examiner*—Anh Tai V Tran

(57) ABSTRACT

Methods and systems for extraction and summarization of sentiment information related to a particular research subject are disclosed. A method includes accessing sources of information that contain sentiment information that is related to the research subject and extracting the sentiment information from the sources of information as opinions related to the research subject. Opinion categories related to features of the research subject are identified. From this information a summarization of the sentiment information that is related to the particular research subject that includes the identified opinion categories is generated. Subsequently, access is provided to the summarization for graphical presentation.

18 Claims, 7 Drawing Sheets

EXTRACTION AND SUMMARIZATION OF SENTIMENT INFORMATION

TECHNICAL FIELD

Embodiments pertain to automated methods and systems for extraction and summarization of sentiment information.

BACKGROUND

The Internet is a publicly accessible worldwide system of interconnected computer networks that accommodates access to Internet connected servers and the information that resides thereon. A related service, the world-wide-web includes the universe of Internet accessible information and encompasses the complete set of documents that reside on all Internet servers. Consequently, the Internet can provide practically instant information on most topics.

Researching subject matter (e.g., products, brands, topics) online can involve a search for and identification of information sources from which information can be obtained and reviewed. In many cases such research can require that an online researcher manually extract and collate information from the identified information sources. Identified information sources can include but are not limited to web pages, etc.

Online researchers who wish to research products, brands, or topics using conventional web search systems must read through many individual web pages in order to gain sufficient knowledge about a subject to form an informed opinion about the subject that they are researching. This can be a very time-consuming process. Moreover, even with a significant investment of time (e.g., reading individual documents) a researcher can be left with a very incomplete picture of the web registered sentiment about the research subject or about individual features of particular research subjects that should be considered.

An automated process used for extraction of information from identified web sources is called sentiment extraction. Sentiment extraction is typically performed as a batch process that involves a large corpus of documents. While conventional sentiment extraction can be effective in some contexts, it can be unsuitable for a web-based document-indexing pipeline for various reasons.

One reason such an approach can be unsuitable for a web-based document indexing pipeline is that it operates against multiple documents instead of a single document, and the size of the task involved severely taxes processing resources and reduces the effectiveness of extraction operations. Moreover, the amount of processing power and the time required to perform the calculations that are involved makes the process unsuitable (for performance reasons) for integration into a document-level indexing pipeline.

SUMMARY

This Summary is provided to introduce a selection of concepts in a simplified form that are further described below in the Detailed Description. This Summary is not intended to be used to limit the scope of the claimed subject matter.

Methods and systems for extraction and summarization of sentiment information related to a particular research subject are disclosed. A method includes accessing sources of information, that are fed or retrieved, that contain sentiment information that is related to the research subject, and extracting the sentiment information from the sources of information as opinions related to the research subject. Opinion categories related to features of the research subject are identified. From this information a summarization of the sentiment information related to the research subject that includes the identified opinion categories is generated. Subsequently, access is provided to the summarization for graphical presentation to end users.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
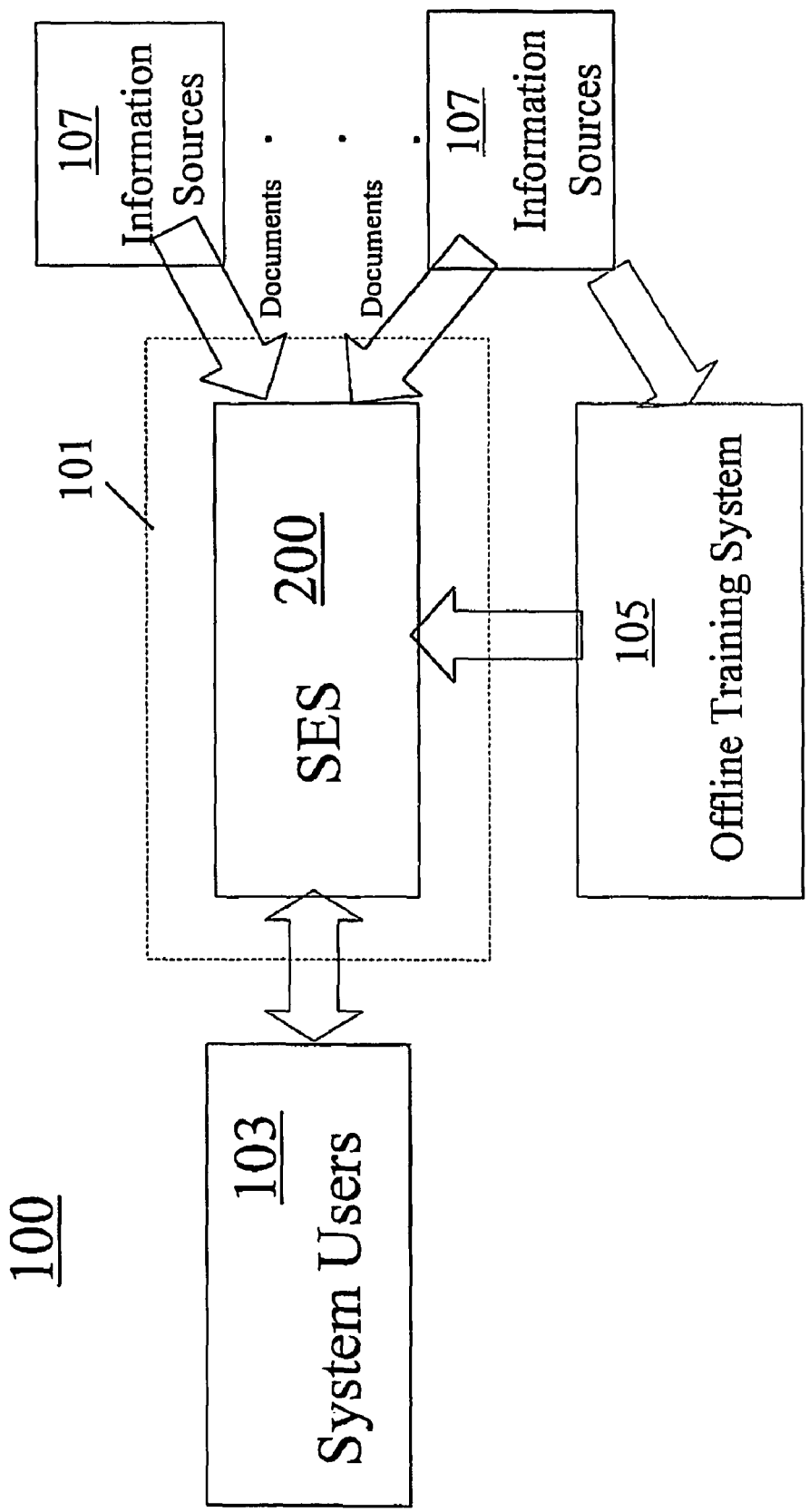
FIG. 1A shows an exemplary network setting for a system for extraction and summarization of sentiment information (SES) according to one embodiment.

Exemplary Network Setting of System for Extraction and Summarization of Sentiment Information According to Embodiments FIG. 1A shows an exemplary network setting 100 for a system 200 for extraction and summarization of sentiment information (SES) according to one embodiment. In one embodiment, SES 200 directs the extraction and summarization of sentiment information related to a research subject. FIG. 1A shows server 101, system users 103, offline training system 105, information sources 107 and SES 200.

Referring to FIG. 1A, SES 200 causes the identification and extraction of sentiment information related to a research subject or research subjects of interest to system users 103 from sources of information that it is able to locate via a computer network (e.g., Internet, LAN, WAN). In one embodiment, SES 200 can extract sentiment information related to many research subjects simultaneously. In this embodiment, if a system user 103 expresses interest in any one research subject, SES 200 can respond by presenting the subset of data related to the research subject of interest.

In one embodiment, a research subject can include but is not limited to consumer products, product brands, or other topics of interest to a system user 103. In one embodiment, SES 200 extracts the aforementioned sentiment information from network sources computer networks that include but are not limited to Internet, LAN, WAN etc.

In one embodiment, SES 200 causes the extraction of important features (e.g., identifies feature related opinion categories) of a research subject that system users 103 are discussing, and characterizes (e.g., positive, negative, or neutral) sentiment associated with each user opinion about that feature. It then summarizes this data in a manner that is easy for system users 103 to read and understand. In one embodiment, the information can be summarized in a manner that coincides with the most discussed features of the research subject. In other embodiments, other manners of summarizing sentiment data can be employed. Thereafter, the summarized information can be presented to system users 103.

Figure 1B:
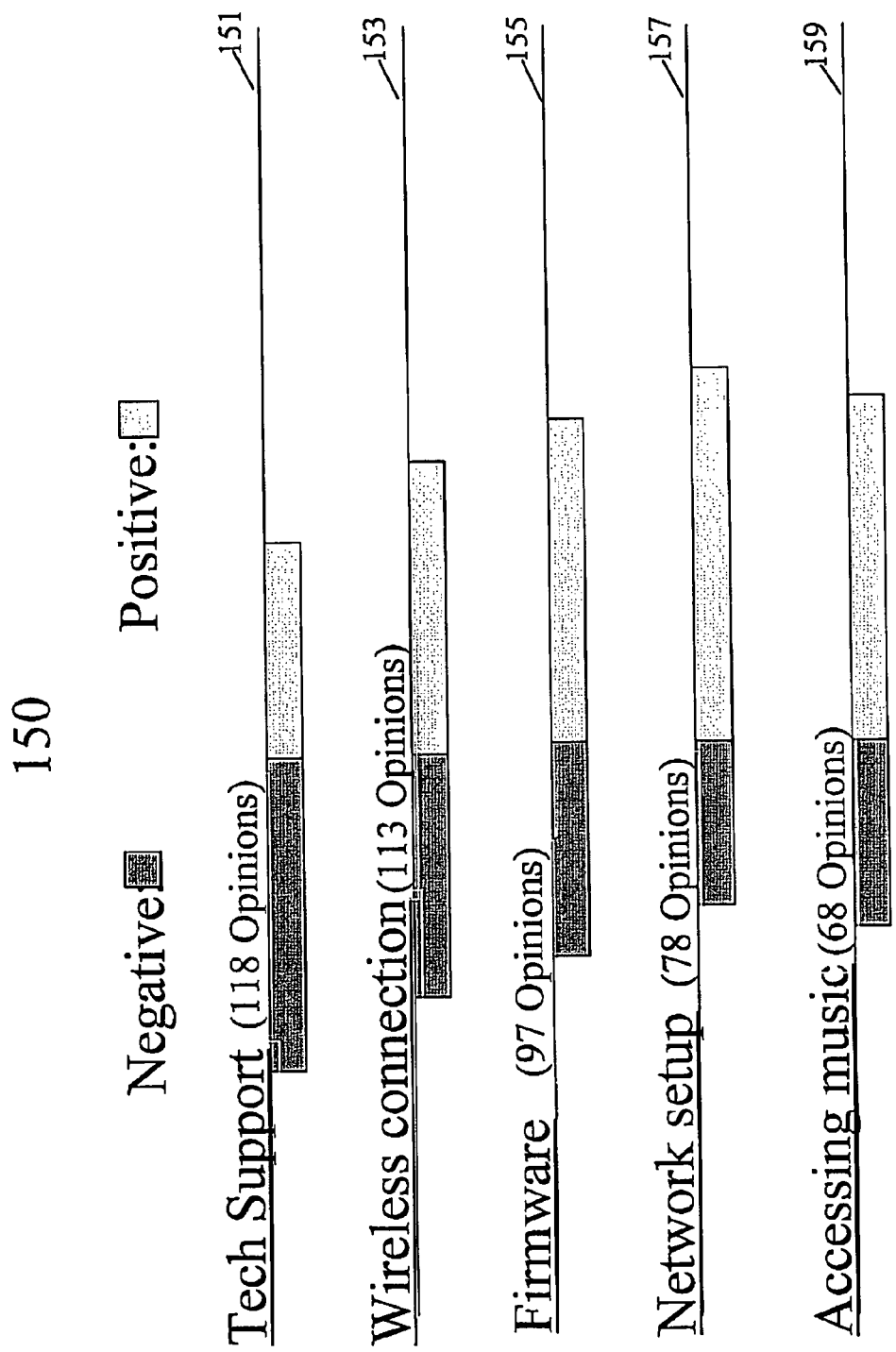
FIG. 1B shows a graphical user interface in which summarized information can be presented to system users according to one embodiment.

In one embodiment, the summarized information can be presented to system users 103 in a graphical user interface (GUI) 150 such as is shown in FIG. 1B. In the FIG. 1B embodiment, a graphical measure of the magnitude of the collective sentiment extracted related to each feature which shows the relative proportions of the collective sentiment that correspond to either positive or negative sentiments is shown. In other embodiments, the invention can be used to show portions of many classes of opinions such as strongly positive, positive, mildly positive, neutral, mixed, mildly negative, etc.

In the FIG. 1B example, five features of a research subject, e.g., a wireless digital music system, are shown as having been identified through operation of SES 200 as being most discussed. In the FIG. 1B example, the identified most discussed features of the wireless music system include tech support 151, wireless connection 153, firmware 155, network setup 157 and accessing music 159.

Figure 1C:
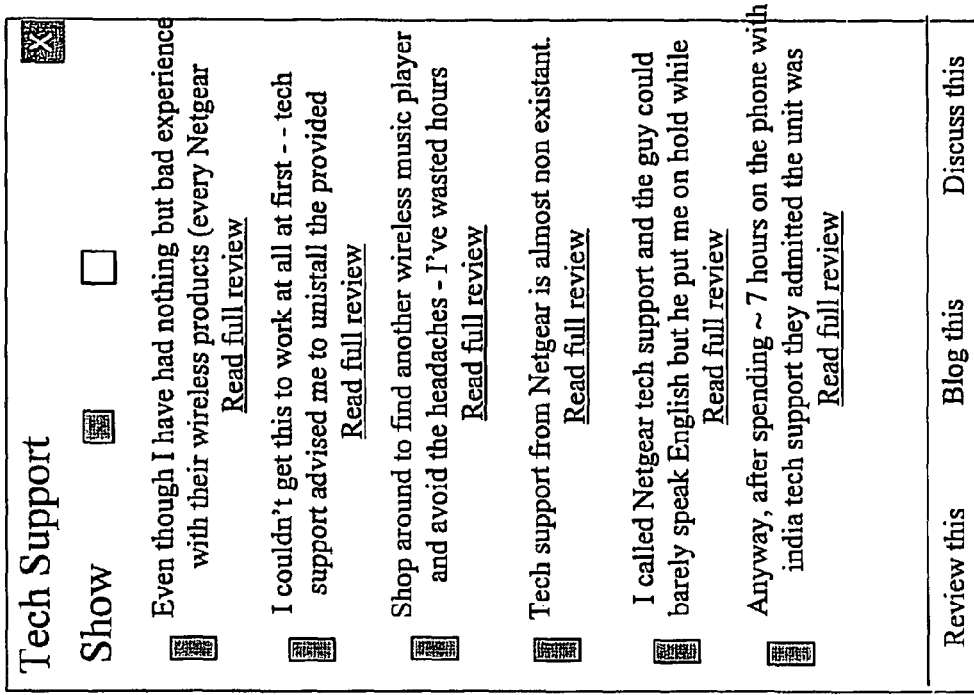
FIG. 1C shows how system users are able to access individual opinions upon which the summarized sentiment information is based according to one embodiment.
Figure 1C:
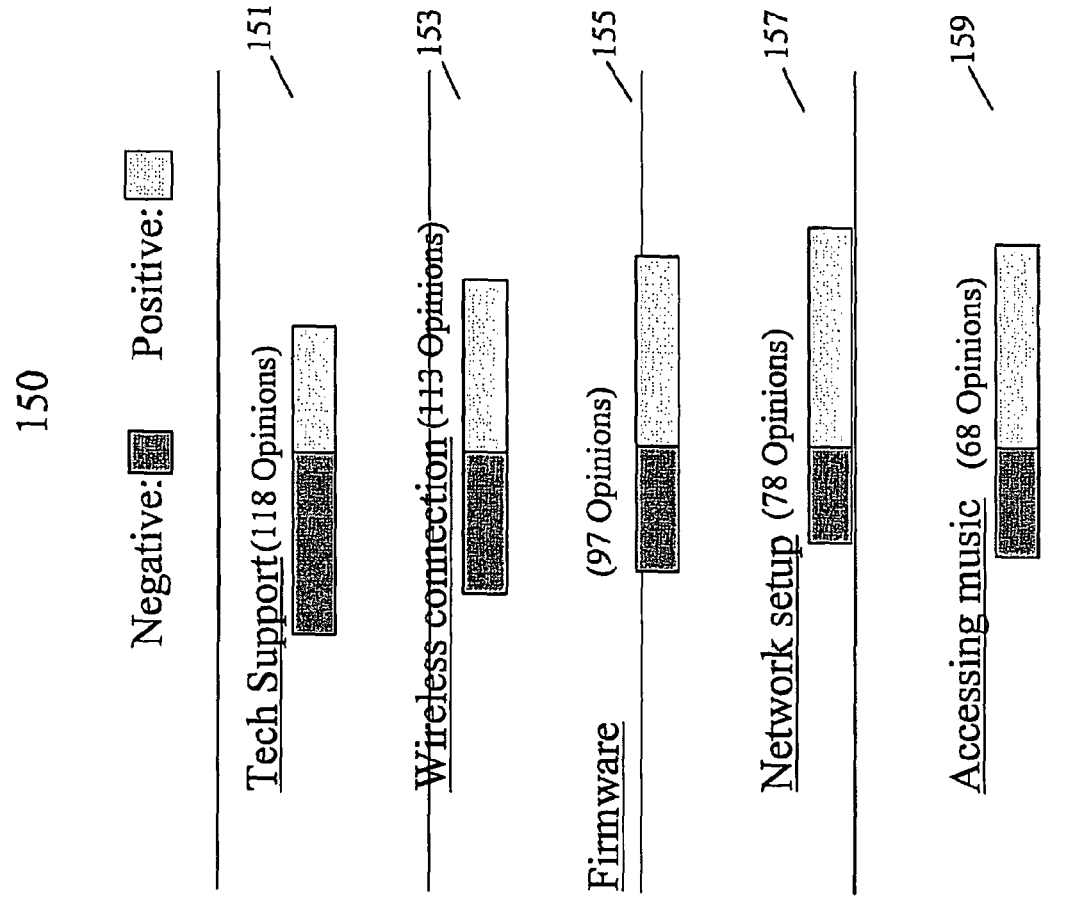

FIG. 1C shows how system users 103 are able to access individual opinions upon which the summarized sentiment information shown in FIG. 1B is based. This provides system users 103 with the capacity to probe beyond a summarized sentiment information level to ascertain the details of extracted sentiments that individual opinions can provide. In one embodiment, system users 103 can provide feedback that can be used to improve SES 200 performance (see FIG. 3 discussion).

Referring again to FIG. 1A, a server 101 can be used to maintain SES 200 according to one embodiment. In an alternate embodiment, SES 200 can be maintained at a location remote from server 101 but operate cooperatively with server 101 to accommodate requests from system users 101.

As previously discussed, system users 103 can direct requests for sentiment extraction and summarization related to a research subject that is of interest to them to SES 200. In one embodiment, system users 101 can make a request by accessing SES 200 via a computer that is a part of the network that encompasses a server (e.g., 101) that is associated with SES 200.

Offline training system 105 is used to improve the algorithm that is used for text extraction and summarization and to periodically provide the updated algorithm for use in text extraction and summarization operations. In one embodiment, offline training system 105 can receive feedback such as from system users 103 and system analysts as training system 105 inputs as is discussed herein in detail with reference to FIG. 3.

Operation

Figure 1D:
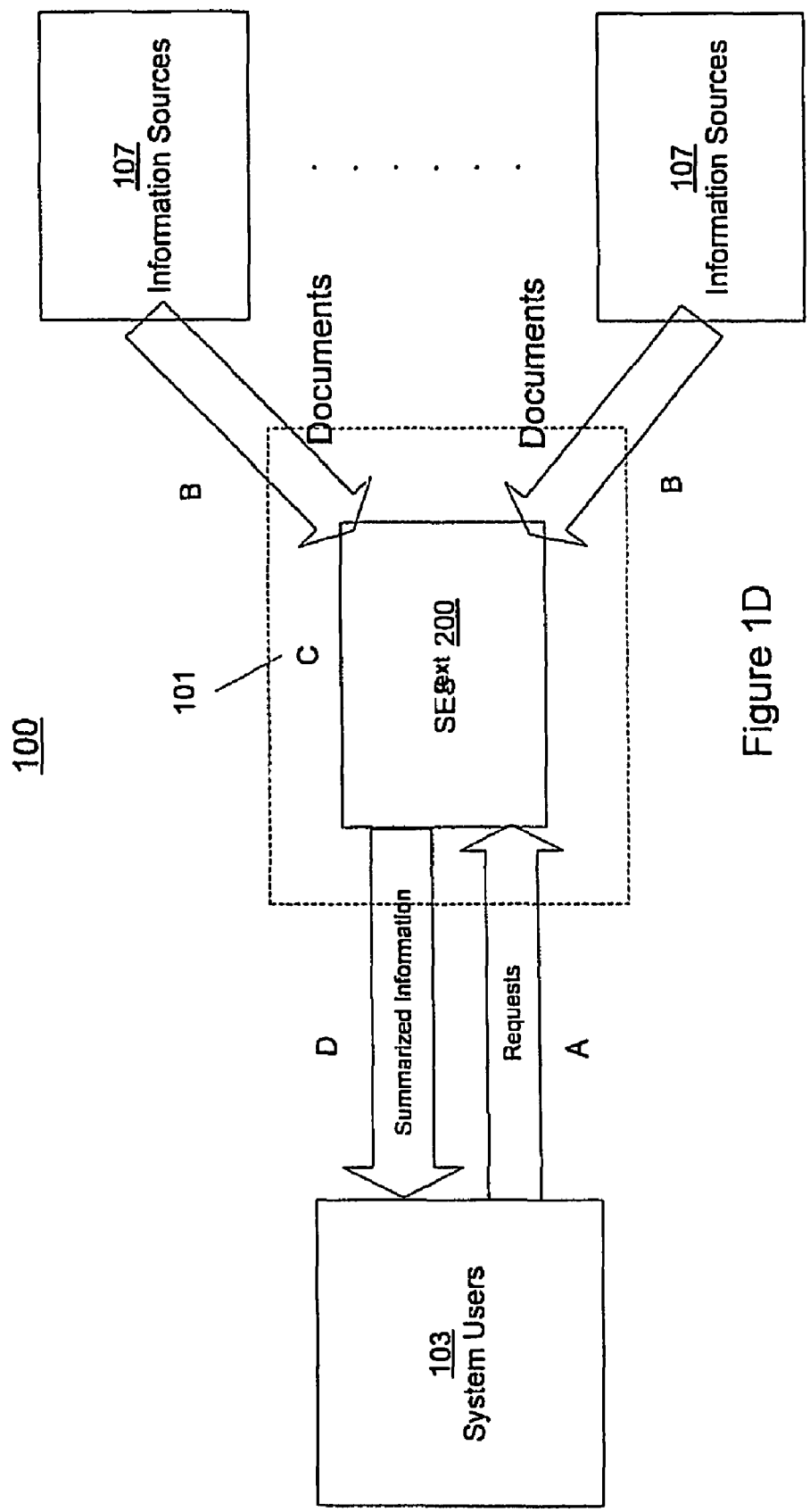
FIG. 1D illustrates operations controlled by SES according to one embodiment.

FIG. 1D illustrates operations A-D controlled by SES 200 according to one embodiment. Referring to FIG. 1D, a system user 103 can initiate the sentiment extraction and summarization process by making a request A for text based sentiment extraction and summarization, related to a desired research subject. In one embodiment, request A can be made via a mechanism such as a terminal (not shown) that is coupled to a network that encompasses server 101. It should be appreciated that SES 200 can in this manner be prompted to direct sentiment extraction and summarization operations C based on text that is found in information sources 107 identified B from a search of network sources. In one embodiment, SES 200 can both search network sources and create a local copy or repository of information from sources that it searches for improved request response time. In one embodiment, using an algorithm whose performance is optimized by offline training system 105, SES 103 can direct the requested sentiment extraction and summarization tasks and then provide access D to the extracted and summarized information. The extracted and summarized information can be accessed D by a presentation engine that can present the information in an interface to a system user 103.

Figure 2:
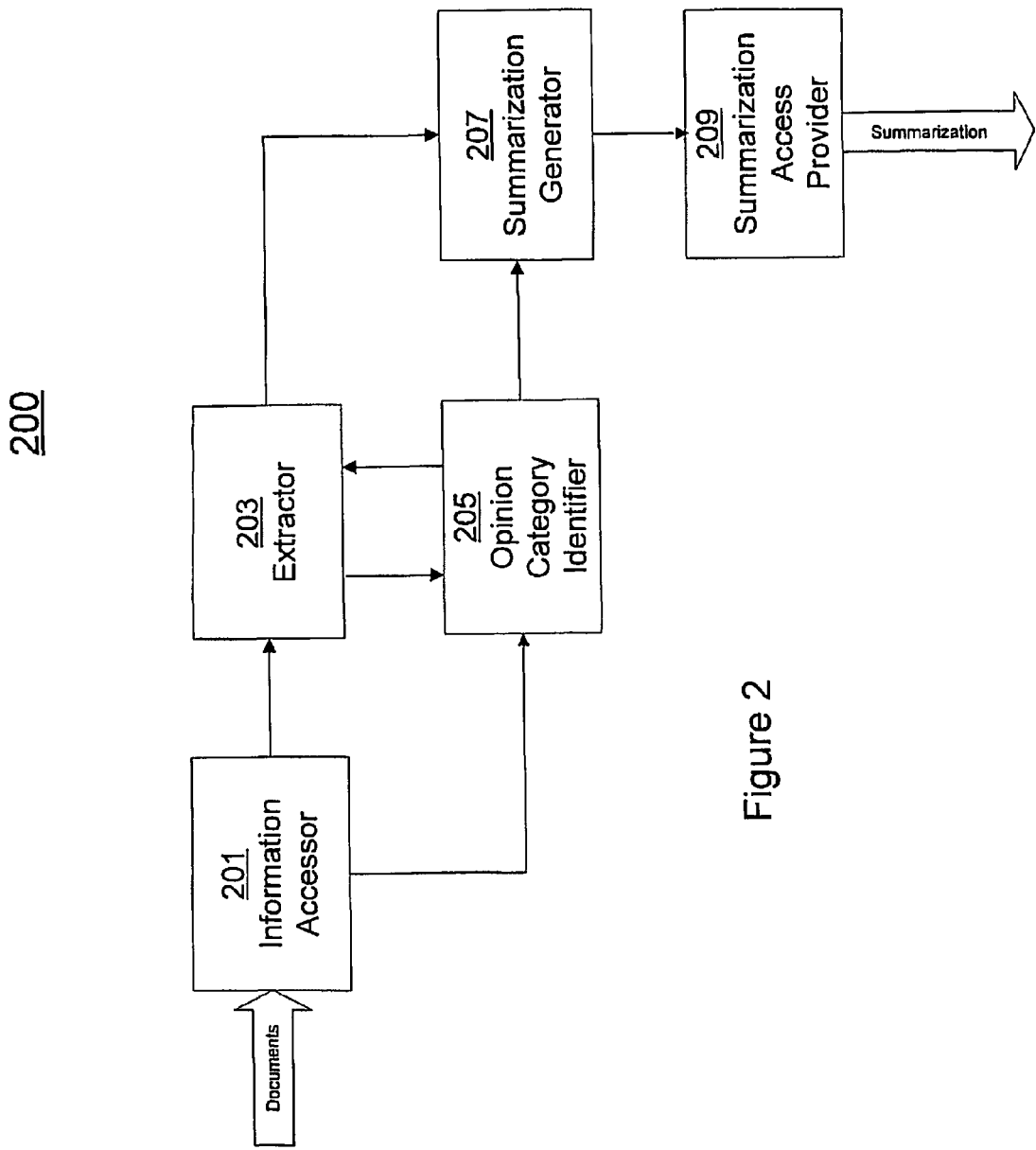
FIG. 2 shows the components of a system for extraction and summarization of sentiment information (SES) according to one embodiment.

FIG. 2 shows the components of a system 200 for extraction and summarization of sentiment information (SES) according to one embodiment. In one embodiment, SES 200 directs the extraction and summarization of sentiment information related to a research subject. In the FIG. 2 embodiment, system 200 includes accessor 201, extractor 203, opinion category identifier 205, summarization generator 207 and access provider 209. In one embodiment, the components of SES 200 can be implemented in software or hardware or a combination of both.

Referring to FIG. 2, information accessor 201 causes the accessing sources of information that contain sentiment information that is related to subject matter that is of interest to system users 103. In one embodiment, the sources of information can include either crawled or feed documents (e.g., received or retrieved) or both (see discussion made with reference to FIG. 3 below).

In other embodiments, the access of information can occur regularly without a matching information accessor 201 request in anticipation of such a request at a later time. In this case, summarizations are stored to fulfill future requests. In one embodiment, the documents thus obtained can be presented for sentiment extraction and/or opinion categorization (see FIG. 2).

Sentiment extractor 203 causes the extraction of sentiment information (e.g., textually recorded opinions) from identified sources of information. In one embodiment, the sentiment information can be opinions related to a research subject (e.g., products, services, brands) that is of interest to system users (e.g., 103 in FIG. 1). It should be appreciated that the sentiment information can be presented for opinion categorization and/or summarization (see FIG. 2).

Opinion category identifier 205 causes the identification of opinion categories related to subject matter based upon a determined magnitude of the number of opinions obtained that are related to opinion categories. It should be appreciated that the opinions corresponding to the identified opinion categories can be either presented for sentiment extraction and/or summarization (see FIG. 2).

Summarization generator 207 causes the generation of a summarization of sentiment information that includes opinion categories. In one embodiment, summarizations that are generated are accessed by access provider 209. And, access provider 209 causes the provision of access to summarizations of user sentiment for presentation to system users (e.g., 103 in FIG. 1). It should be appreciated that many different types of summarizations can be provided and can include but is not limited to, for example, the proportion of different sentiment classes (positive, negative, neutral, mildly positive, mildly negative, strongly positive, strongly negative, etc.) that are represented in the opinions that are obtained.

Figure 3:
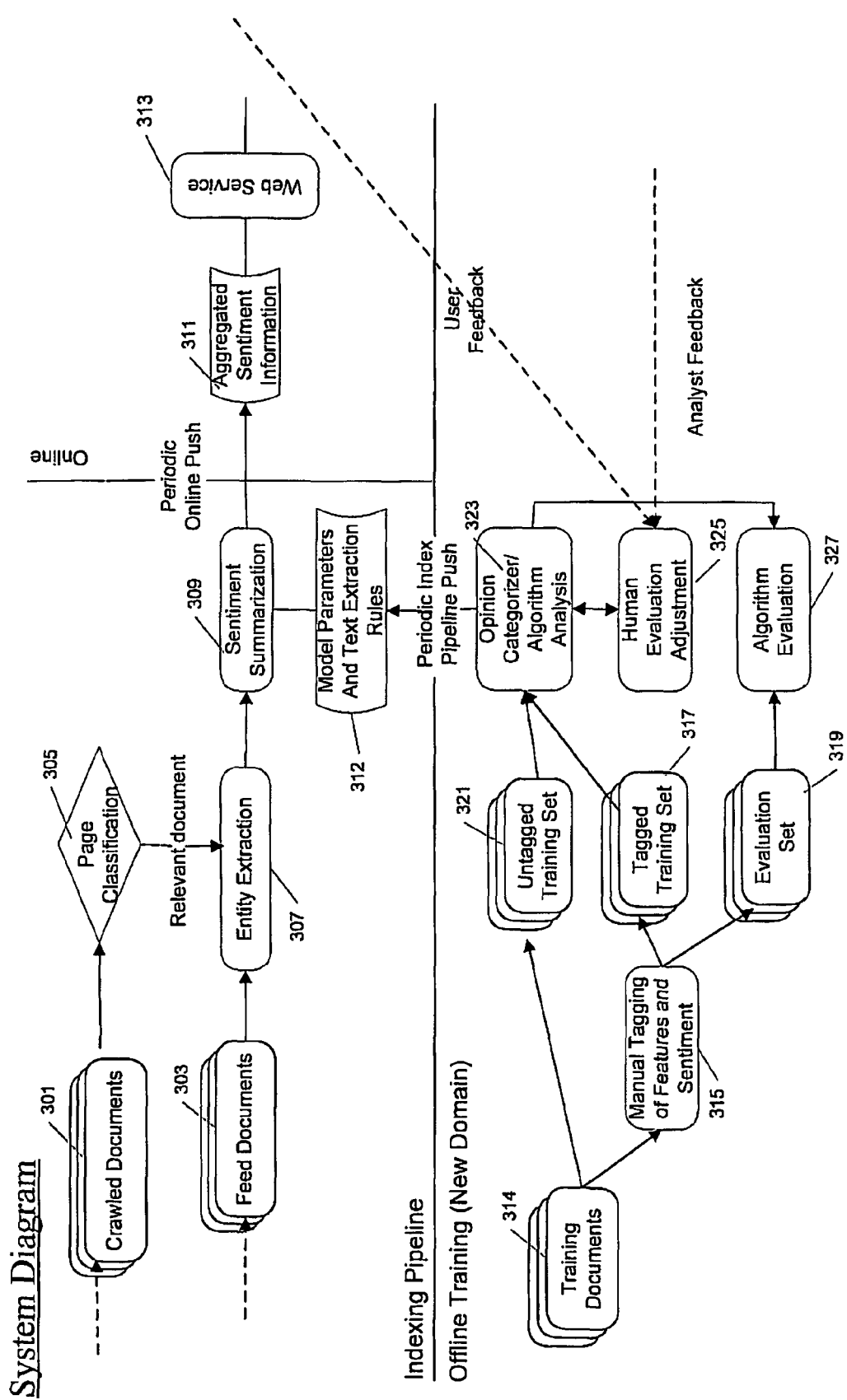
FIG. 3 shows a flow diagram that shows the interrelationship of a system for extraction and summarization of information and an offline training system according to one embodiment.

FIG. 3 shows a flow diagram that illustrates the interrelationship of an exemplary system for extraction and summarization of information (e.g., 200 in FIG. 1) and an exemplary offline training system (e.g., 105 in FIG. 1) according to one embodiment. It should be appreciated that the operations related to blocks 301-313 shown in FIG. 3 are encompassed by or are associated with operations of components of an exemplary system for extraction and summarization of information (e.g., 200 in FIG. 1). Moreover, the operations related to blocks 314-327 shown in FIG. 3 are encompassed by or are associated with operations of components of an exemplary offline training system (e.g., 105 in FIG. 1).

In one embodiment, documents can be streamed into the system in real time from multiple sources. For example, in the FIG. 3 embodiment, both crawled documents 301 (e.g., documents that are obtained by a web-crawler) and feed documents 303 (e.g., documents of known relevance and format that are fed into the system) are shown as being accessed for text extraction and summarization.

Referring to FIG. 3, at 305 whether the crawled documents 301 express opinions about the range of products, items etc. that are undergoing sentiment evaluation is determined. And, at 305 documents relevant to this range of products, items etc. are passed to 307. At 307 the crawled documents found to be relevant at 305, in addition to the feed documents of known relevance and format, are subjected to entity extraction where components of an input document are identified (e.g., reviewer name, review body, review rating) that can aid in subsequent opinion identification. At 309 sentiment information is summarized and at 311 aggregated for presentation purposes.

In one embodiment, offline training system operates to optimize extraction rules that are employed in the sentiment evaluation processes for a particular domain. In the FIG. 3 embodiment, training documents 313 are used to "train" (e.g., improve, optimize) an algorithm by facilitating the acquisition and integration of knowledge that is acquired from training documents 313 into the algorithm. In one embodiment, the knowledge thus acquired and integrated can improve the algorithms performance.

In one embodiment, the training process can be initiated by having all features and sentiment about a research subject that is present in training documents 313 manually tagged at 315 to produce a tagged training set 317 and an evaluation set 319.

In one embodiment, tagged training set 317 provides examples from which optimized rules can be learned and evaluation set 319 provides a standard by which performance (what actually is learned) can be tested.

In one embodiment, this tagging can involve a manual labeling of the identified features and sentiments related to the research subject that appear in the text of the training documents. For example, it may be found in document text that the research subject feature "performance" is discussed with an appurtenant sentiment "performs really well." In this case, a labeler can label the term "performs really well" and record the polarity of the term, e.g., positive, negative or neutral (in the example case "performs really well" is positive).

In one embodiment, untagged training set 321 and tagged training set 317 are provided as inputs to a opinion categorization/algorithm analysis sub-system 323. In one embodiment, sub-system 323 analyzes untagged training set 321 and tagged training set 323 to identify patterns in underlying data related to sentiment extraction and polarity characterization such as the percentages of times sentiment extractions or polarity characterizations are correct or are incorrect. The patterns can implicate parameters of the algorithm that should be changed in order to eliminate errors and improve the performance of the algorithm. In one embodiment, these parameters can be identified through an algorithmic evaluation at 327 of the patterns identified by clustering/analysis sub-system 323 using evaluation set 319.

In one embodiment, at 325 an analyst can take the information provided by the feature clustering/analysis sub-system 323 and use it to make adjustments to parameters of the algorithm. These adjustments can be applied to 309 by copying over 312 to eliminate algorithmic weaknesses or take advantage of algorithm strengths. In one embodiment, in this manner sentiment extraction and polarity characterizations can be optimized.

Figure 4:
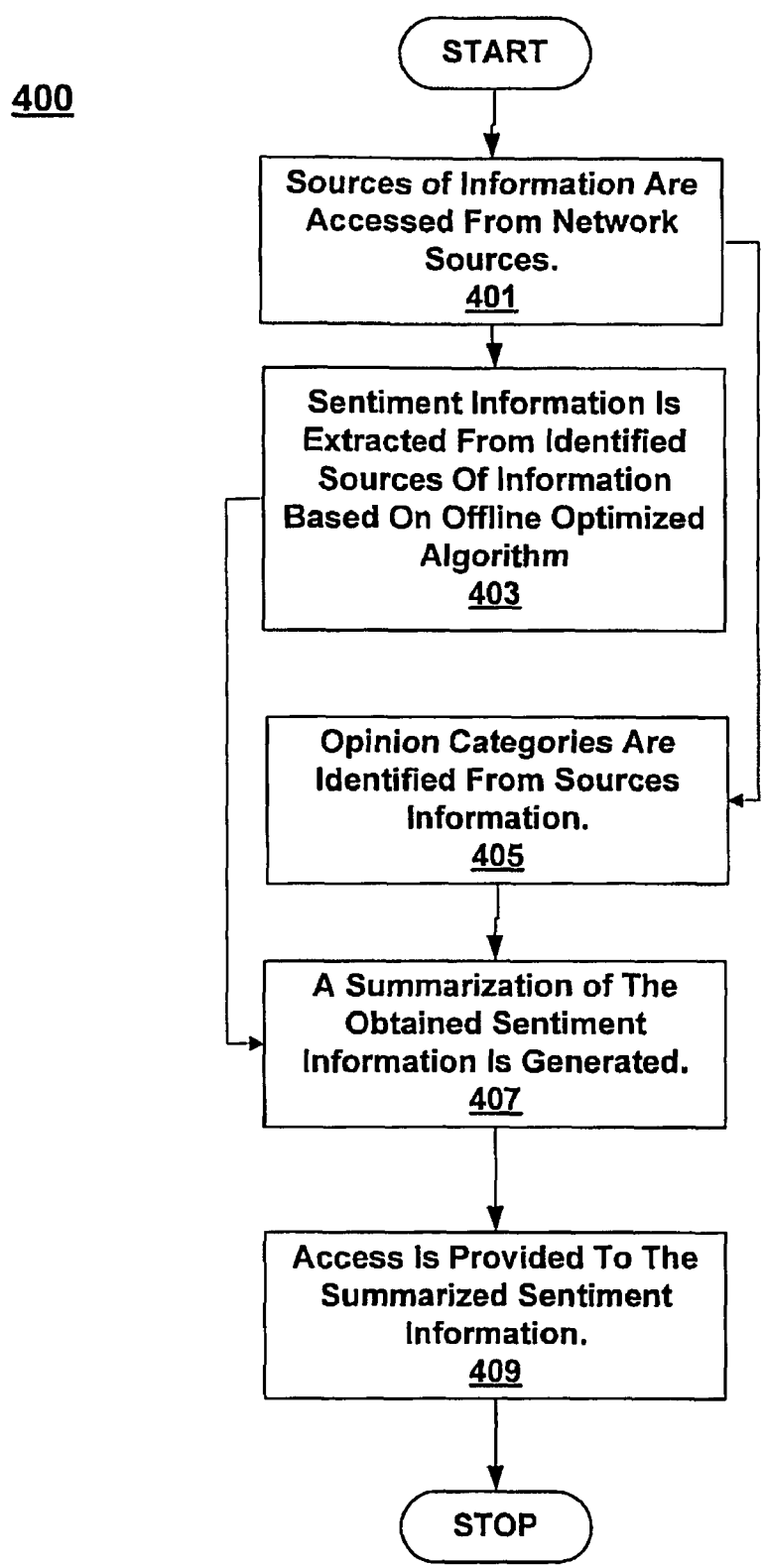
FIG. 4 shows a flowchart of the steps performed in a method for extraction and summarization of sentiment information contained in sources of information that is related to a particular research subject according to one embodiment.

Exemplary Operations of Method for Extraction and Summarization of Sentiment Information According to Embodiments FIG. 4 shows a flowchart 400 of the steps performed in a method for extraction and summarization of sentiment information contained in sources of information that is related to a particular research subject according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 4, at step 401, sources of information are accessed from network sources. In one embodiment, an information accessor (e.g., 201 in FIG. 2) can cause the accessing of sources of information that contain sentiment information that is related to subject matter that is of interest to system users 103. In other embodiments, the access of information can occur regularly without a matching information accessor request in anticipation of such a request at a later time. In this case summarizations are stored to fulfill future requests. As discussed herein, the sources of information can include either crawled or feed documents or both (e.g., received or retrieved). In one embodiment, the documents thus obtained can be presented for sentiment extraction (e.g., step 403) and/or opinion categorization (e.g., step 405).

At step 403, sentiment information (e.g., textually registered opinions) is extracted from identified sources of information. In one embodiment, a sentiment extractor (e.g., 203 in FIG. 2) causes the extraction of sentiment information (e.g., textually recorded opinions) from identified sources of information. As discussed herein, the sentiment information can be opinions related to a research subject (e.g., products, services, brands) that is of interest to system users (e.g., 103 in FIG. 1). It should be appreciated that sentiment information is extracted based on an algorithm optimized in an offline training process. It should be appreciated that the sentiment information can be presented for opinion categorization (e.g., step 405) and/or summarization (e.g., step 407).

At step 405, opinion categories are identified. In one embodiment, the opinion categories can be identified based upon a determined magnitude of the number of opinions obtained that are related to the opinion categories. In other embodiments, other manners of identifying opinion categories can be used. In one embodiment, an opinion category identifier (e.g., 205 in FIG. 2) directs the identification of opinion categories. It should be appreciated that the opinions corresponding to the identified opinion categories can be either presented for sentiment extraction (e.g., step 403) and/or summarization (e.g., step 407).

At step 407, a summarization of the obtained sentiment information is generated. In one embodiment, a summarization generator (e.g., 207 in FIG. 2) causes the generation of the summarization of the obtained sentiment information. And, at step 409, access is provided to the sentiment information for presentation to the requesting system user (e.g., 103 in FIG. 1).

In accordance with exemplary embodiments thereof, methods and systems for extraction and summarization of sentiment information related to a particular research subject are disclosed. A method includes accessing sources of information that contain sentiment information that is related to the research subject and extracting the sentiment information from the sources of information as opinions related to the research subject. Opinion categories related to features of the research subject are identified. From this information a summarization of the sentiment information related to the research subject that includes the identified opinion categories is generated. Subsequently, access is provided to the summarization for graphical presentation.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method for extraction and summarization of sentiment information contained in sources of information that is related to a particular research subject, comprising:

using a processor to access said sources of information that contain said sentiment information that is related to a plurality of research subject, said sentiment information comprises textually recorded information that characterize a user's opinion related to said research subject;

simultaneously extracting said sentiment information from said sources of information as opinions related to the plurality of research subjects said research subject based on model parameters and text extracting rules;

identifying opinion categories related to features of said particular research subject based upon a determined magnitude of the number of opinions obtained that are related to said opinion categories;

generating a summarization of said sentiment information that comprises said opinion categories;

providing access to said summarization of said sentiment information for graphical presentation;

updating said model parameters and said text extracting rules based on an offline training process and feedback from users, comprising:

identifying sentimental information within tagged training sets and untagged training sets;

identifying polarity characterizations of the sentimental information within the tagged training set;

updating opinion categories based on the identified polarity characterizations and the feedback from users;

updating said model parameters and said text extracting rules based on the identified polarity characterization; and accessing said updated model parameters and text extracting rules for use in extraction and summarization of said sentiment information.

2. The method of claim 1 wherein said offline training process comprises manual tagging, feature clustering analysis, human evaluation and adjustment and algorithm evaluation.

3. The method of claim 1 wherein said sources of information comprise customer reviews, forums, discussion groups, and blogs.

4. The method of claim 1 wherein said opinions are capable of being accessed and reviewed individually.

5. The method of claim 4 wherein said opinions that are capable of being accessed and reviewed individually are graphically presented.

6. A computer-readable storage medium having computer-executable instructions for performing extraction and summarization of sentiment information contained in sources of information that is related to a particular research subject comprising:

using a processor to access said sources of information that contain said sentiment information that is related to a plurality of research subject, said sentiment information comprises textually recorded information that characterize a user's opinion related to said research subject;

simultaneously extracting said sentiment information from said sources of information as opinions related to the plurality of research subjects said research subject based on model parameters and text extracting rules;

identifying opinion categories related to features of said particular research subject based upon a determined magnitude of the number of opinions obtained that are related to said opinion categories;

generating a summarization of said sentiment information that comprises said opinion categories;

providing access to said summarization of said sentiment information for graphical presentation;

updating said model parameters and said text extracting rules based on an offline training process and feedback from users, comprising:

identifying sentimental information within tagged training sets and untagged training sets;

identifying polarity characterizations of the sentimental information within the tagged training set;

updating opinion categories based on the identified polarity characterizations and the feedback from users;

updating said model parameters and said text extracting rules based on the identified polarity characterization; and accessing said updated model parameters and text extracting rules for use in extraction and summarization of said sentiment information.

7. The storage medium of claim 6 wherein said offline training process comprises manual tagging, feature clustering analysis, human evaluation and adjustment and algorithm evaluation.

8. The storage medium of claim 6 wherein said documents are found at various internet addresses.

9. The storage medium of claim 6 wherein said documents include customer reviews, forums, discussion groups, and blogs.

10. The storage medium of claim 6 wherein said features comprise topics related to said subject matter that are discussed most often.

11. The storage medium of claim 6 wherein said opinions are capable of being accessed and reviewed individually.

12. An apparatus comprising: a processor for executing a method for extraction and summarization of sentiment information contained in sources of information that is related to a particular research subject, comprising:
   using a processor to access said sources of information that contain said sentiment information that is related to a plurality of research subject, said sentiment information comprises textually recorded information that characterize a user's opinion related to said research subject;
   simultaneously extracting said sentiment information from said sources of information as opinions related to the plurality of research subjects said research subject based on model parameters and text extracting rules;
   identifying opinion categories related to features of said particular research subject based upon a determined magnitude of the number of opinions obtained that are related to said opinion categories;
   generating a summarization of said sentiment information that comprises said opinion categories;
   providing access to said summarization of said sentiment information for graphical presentation;
   updating said model parameters and said text extracting rules based on an offline training process and feedback from users, comprising:
   identifying sentimental information within tagged training sets and untagged training sets;
   identifying polarity characterizations of the sentimental information within the tagged training set;
   updating opinion categories based on the identified polarity characterizations and the feedback from users;
   updating said model parameters and said text extracting rules based on the identified polarity characterization; and
   accessing said updated model parameters and text extracting rules for use in extraction and summarization of said sentiment information.

13. The apparatus of claim 12 wherein said offline training process comprises manual tagging, feature clustering analysis, human evaluation and adjustment and algorithm evaluation.

14. The apparatus of claim 12 wherein said documents are found at various internet addresses.

15. The apparatus of claim 12 wherein said documents include customer reviews, forums, discussion groups, and blogs.

16. The apparatus of claim 12 wherein said research subject is a product or a service.

17. The apparatus of claim 12 wherein said opinions are capable of being accessed and reviewed individually.

18. The method of claim 1, further comprising determining whether said sources of information contain information related to said research subject.

* * * * *